United States Patent [19]
Yamamoto et al.

[11] 3,907,812
[45] Sept. 23, 1975

[54] BUTYROPHENONE DERIVATIVES

[75] Inventors: Hisao Yamamoto, Nishinomiya; Tadashi Okamoto, Ashiya; Kikuo Sasajima; Masaru Nakao, both of Toyonaka; Isamu Maruyama, Minoo; Shigenari Katayama, Takarazuka, all of Japan

[73] Assignee: Sumitomo Chemical Company, Limited, Osaka, Japan

[22] Filed: Feb. 2, 1973

[21] Appl. No.: 329,130

Related U.S. Application Data

[63] Continuation-in-part of Ser. No. 180,181, Sept. 13, 1971, abandoned, which is a continuation-in-part of Ser. No. 54,836, July 14, 1970, abandoned.

[52] U.S. Cl. .... 260/293.77; 260/293.79; 260/293.8; 424/267
[51] Int. Cl.² .................................... C07D 211/52
[58] Field of Search........ 260/293.77, 293.79, 293.8

[56]         References Cited
UNITED STATES PATENTS

| | | | |
|---|---|---|---|
| 3,080,372 | 3/1963 | Janssen............ | 260/293.8 |
| 3,438,991 | 4/1969 | Janssen............ | 260/293.8 |
| 3,518,276 | 6/1970 | Janssen............ | 260/293.8 |

FOREIGN PATENTS OR APPLICATIONS

| 110,185 | 11/1964 | Netherlands.......... | 260/293.8 |
|---|---|---|---|

OTHER PUBLICATIONS

Theilheimer, "Synthetic Methods of Organic Chemistry", (1953), Vol. 7: Sec. 213.
Theilheimer, "Synthetic Methods of Organic Chemistry", (1954), Vol. 8: Sec. 182.
Janssen, International J. Neuropharm. 1, 145–146 (1962).
Wagner et al., Synthetic Organic Chemistry, (1953), 14, 15, 94, 95, 167–168, 678–679, 772–773.
Janssen et al., J. Med. Chem., 1, 105–119 (1959).

Primary Examiner—G. Thomas Todd
Attorney, Agent, or Firm—Stevens, Davis, Miller & Mosher

[57]              ABSTRACT

A novel process for preparing central nervous system active butyrophenone derivatives in which γ-piperidinobutyrophenone derivatives of the formula,

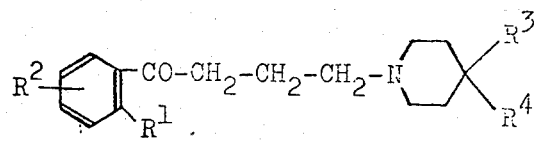

wherein $R^1$ is hydrogen, halogen, amino, acylamino, alkylamino or N-acylalkylamino; $R^2$ is hydrogen or halogen; $R^3$ is hydrogen or unsubstituted or alkyl-, alkoxy-, halogen- or trifluoromethyl-substituted phenyl; and $R^4$ is hydrogen or hydroxyl, can be prepared by reacting an indole derivative of the formula,

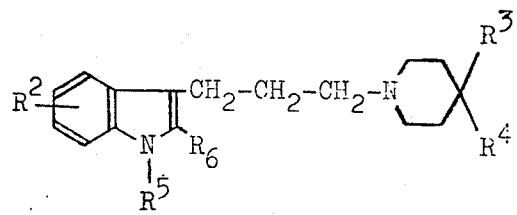

wherein $R^2$, $R^3$ and $R^4$ are as defined above, and $R^5$ and $R^6$ are each independently hydrogen or alkyl, with an oxidizing agent to yield an o-acylamino-γ-piperidinobutyrophenone derivative of the formula,

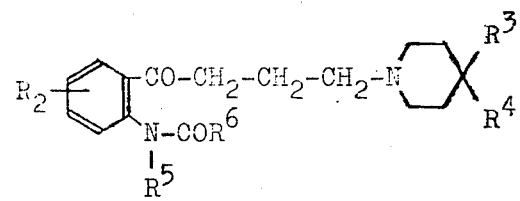

wherein $R^2$, $R^3$, $R^4$, $R^5$ and $R^6$ are as defined above, and further, if necessary, hydrolyzing the product to yield an o-amino-γ-piperidinobutyrophenone derivative of the formula,

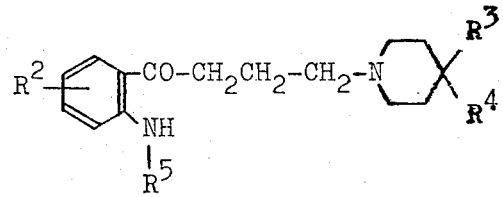

wherein $R^2$, $R^3$, $R^4$ and $R^5$ are as defined above, and further diazotizing, if desired, in case $R^5$ is hydrogen, the obtained o-amino-γ-piperidinobutyrophenone derivative and subsequently decomposing the resultant diazonium compound to replace the diazonium group by hydrogen or halogen. Among the butyrophenone derivatives thus obtained, those in which $R^1$ is halogen, amino, acylamino, alkylamino or N-acylalkylamino are novel compounds.

17 Claims, No Drawings

BUTYROPHENONE DERIVATIVES

CROSS REFERENCE TO RELATED APPLICATIONS

This is a continuation-in-part of co-pending application Ser. No. 180181, filed on Sept. 13, 1971, now abandoned which is in turn a continuation-in-part of application Ser. No. 54,836, filed on July 14, 1970, now abandoned.

The present invention relates to a novel process for producing butyrophenone derivatives. More particularly, the invention relates to a novel process for producing central nervous system active γ-piperidinobutyrophenone derivatives. The invention also pertains to novel central nervous system active γ-piperidinobutyrophenone derivatives and pharmaceutical use of the same.

Investigations were made order to find an advantageous process by which a substituted γ-piperidinobutyrophenone derivative having a substituent at the ortho position could be produced. As a result, a novel and advantageous process for producing various substituted γ-piperidinobutyrophenone derivatives including such orthosubstituted compounds were found. The most important characteristic of the process resides in the production of o-acylamino-γ-piperidinobutyrophenone derivatives by the oxidation of 3-γ-piperidinopropylindole derivatives. The acylamino group of the o-acylamino-γ-piperidinobutyrophenone derivatives thus obtained can be converted to unsubstituted or substituted amino groups by conventional hydrolysis reaction and further subsequently to hydrogen or halogen by diazotization decomposition. Therefore, according to the process of our finding, various γ-piperidinobutyrophenone derivatives can be produced very advantageously.

Accordingly, an object of the present invention is to provide a novel and advantageous process for producing γ-piperidinobutyrophenone derivatives.

Another object of the invention is to provide novel central nervous system active γ-piperidinobutyrophenone derivatives.

A further object of the invention is to provide a pharmaceutical use of such γ-piperidinobutyrophenone derivatives.

Other objects and merits of the invention will be apparent from the following description.

The present invention provides a process for producing a γ-piperidinobutyrophenone compound of the formula,

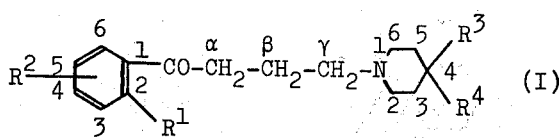

wherein $R^1$ is hydrogen, halogen, amino, $C_1$–$C_5$ alkanoylamino, $C_1$–$C_4$ alkylamino or N-($C_1$–$C_5$ alkanoyl)$C_1$–$C_4$ alkylamino; $R^2$ is hydrogen or halogen; $R^3$ is hydrogen or unsubstituted or $C_1$–$C_4$ alkyl-, $C_1$–$C_4$ alkoxy-, halogen- or trifluoromethyl-substituted phenyl; and $R^4$ is hydrogen or hydroxyl, and an acid addition salt thereof, which comprises contacting an indole compound of the formula,

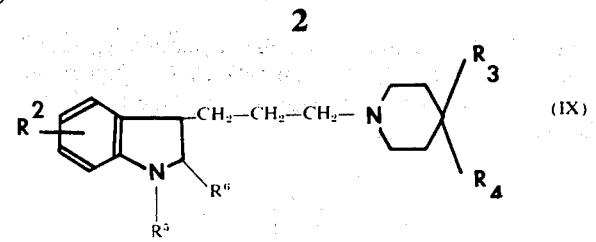

wherein $R^5$ and $R^6$ are each independently hydrogen or $C_1$–$C_4$ alkyl, and $R^2$, $R^3$ and $R^4$ are as defined above, with an oxidizing agent to yield a compound of the formula,

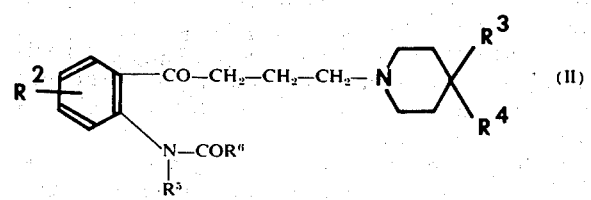

wherein $R^2$, $R^3$, $R^4$, $R^5$ and $R^6$ are as defined above, and if necessary, hydrolyzing the resulting compound of the formula (II) to a compound of the formula,

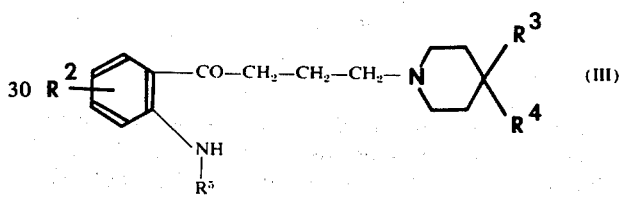

wherein $R^2$, $R^3$, $R^4$ and $R^5$ are as defined above, and further diazotizing, if desired, in case $R^5$ is hydrogen, the resulting compound of the formula (III) and subsequently decomposing the resulting diazonium compound to replace the diazonium group by hydrogen or halogen to yield a compound of the formula,

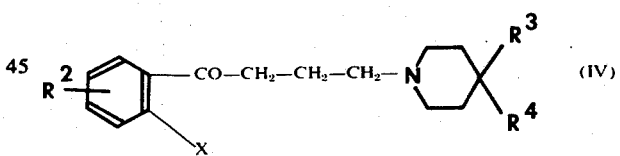

wherein X is hydrogen or halogen; and $R^2$, $R^3$ and $R^4$ are as defined above.

Further the present invention provides a novel compound of the formula,

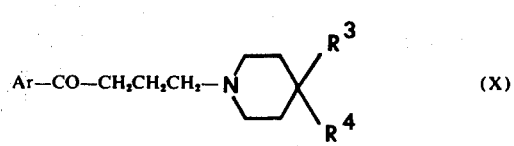

wherein Ar is a group having the formula,

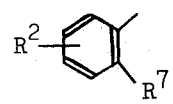

(wherein R[7] is amino, $C_1$–$C_5$ alkanoylamino, $C_1$–$C_4$ alkylamino, or N-($C_1$–$C_5$ alkanoyl) $C_1$–$C_4$ alkylamino; and R[2] is hydrogen or halogen) or a group having the formula,

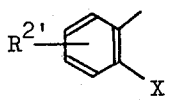

(wherein X is halogen; and R[2'] is halogen); R[3] is hydrogen or unsubstituted or $C_1$–$C_4$ alkyl-, $C_1$–$C_4$ alkoxy-, halogen- or trifluoromethyl-substituted phenyl; and R[4] is hydrogen or hydroxyl, and a pharmaceutically acceptable acid addition salt thereof.

Furthermore the present invention provides a pharmaceutical composition containing the aforementioned novel compound represented by the formula (X) as an active ingredient.

In the present invention, the halogen atom may be fluorine, chlorine, bromine or iodine and is preferably fluorine or chlorine.

Particarly preferable compounds within the formula (X) are those wherein Ar is a group,

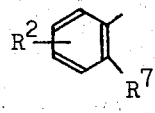

(wherein R[7] is amino or $C_1$–$C_5$ alkanoylamino and R[2] is halogen), R[3] is unsubstituted or $C_1$–$C_4$ alkyl-, $C_1$–$C_4$ alkoxy, halogen- or trifluoromethyl-substituted phenyl and R[4] is hydroxyl. For example,

and

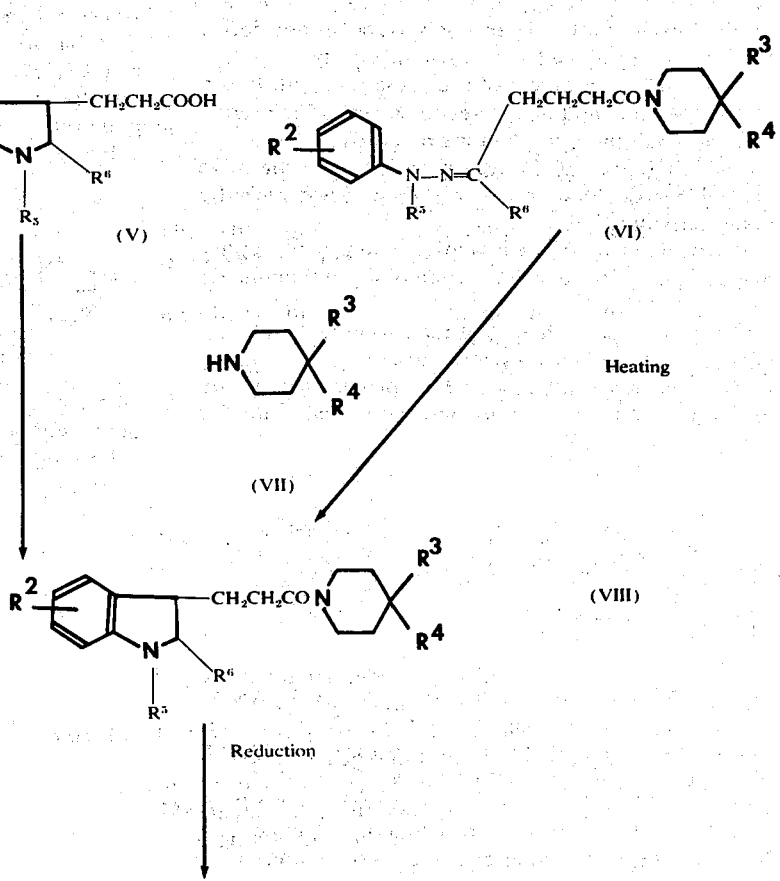

are preparable.

Other preferable compounds within the formula (X) are those wherein Ar is a group, (wherein R[2'] is fluorine and X is halogen), R[3] is phenyl substituted by $C_1$–$C_4$ alkyl, $C_1$–$C_4$ alkoxy, halogen or trifluoromethyl and R[4] is hydroxyl.

The compounds of the present invention coming within the formula (I) may be prepared by a process which can be represented by the following reaction scheme.

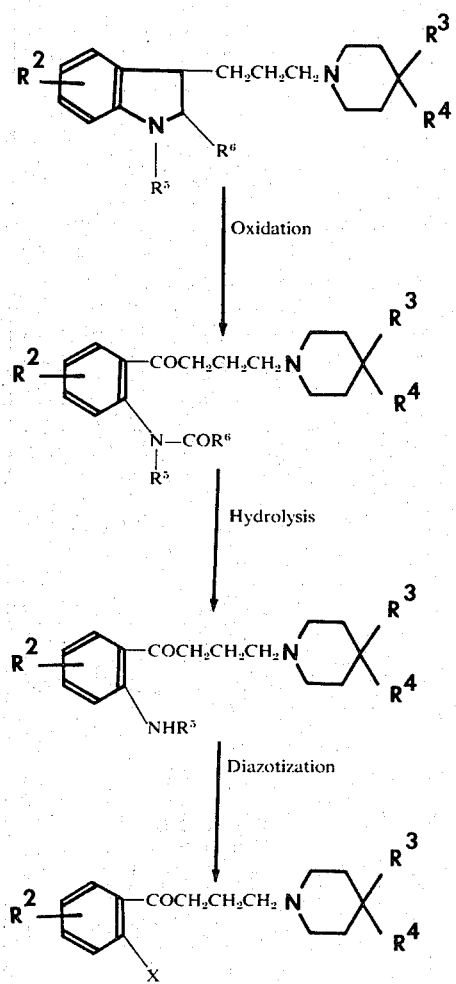

wherein $R^2$, $R^3$, $R^4$, $R^5$, $R^6$ and X are as identified above.

A 1-(β-(3-indolyl)propionyl)piperidine compound of the formula (VIII) used as an intermediate in the present process can be prepared by reacting an indolylpropionic acid of the formula (V), or its functionally active derivative such as acid chloride, acid bromide, acid anhydride, mixed acid anhydride, p-nitrophenyl ester and the like, with a piperidine of the formula (VII). The reaction is preferably carried out in the presence of a basic agent or a condensing agent such as pyridine, triethylamine, sodium carbonate, sodium hydroxide, dicyclohexylcarbodiimide and the like in a suitable inert organic solvent such as tetrahydrofuran, ether, dioxane, benzene, toluene, chloroform, dimethylformamide and the like.

The mixed acid anhydride mentioned above includes those prepared by treating with ethyl chloroformate, isobutyl chloroformate or the like.

The intermediate compound of the formula (VIII) can also be prepared by heating a phenylhydrazone compound of the formula (VI). The heating is preferably carried out in the presence of an acidic condensing agent such as, for example, hydrogen chloride, sulfuric acid, phosphoric acid, zinc chloride, copper chloride, boron fluoride, polyphosphoric acid and the like in a suitable solvent such as ethanol, isopropanol, tertiary-butanol, acetic acid, benzene, toluene, water and the like.

According to the method mentioned above, the following compounds can be easily obtained.

1-(β-(2-Methyl-3-indolyl)propionyl)-4-phenylpiperidine
1-[β-(2-Methyl-5-chloro-3-indolyl)propionyl]-4-phenylpiperidine
1-[β-(2-Methyl-3-indolyl)propionyl)piperidine
1-[β-(2-Methyl-5-fluoro-3-indolyl)propionyl]piperidine
1-[β-(2-Methyl-6-fluoro-3-indolyl)propionyl]piperidine
1-[β-(1,2-Dimethyl-5-fluoro-3-indolyl)propionyl]piperidine
1-[β-(1-Ethyl-2-methyl-5-fluoro-3-indolyl)propionyl]piperidine
1-[β-(1-Isopropyl-2-methyl-5-fluoro-3-indolyl)propionyl]piperidine
1-[β-(5-Fluoro-3-indolyl)propionyl]piperidine
1-[β-(1-Methyl-5-fluoro-3-indolyl)propionyl)]piperidine
1-[β-(2-Methyl-5-fluoro-3-indolyl)propionyl]-4-phenylpiperidine
1-[β-(2-Methyl-5-fluoro-3-indolyl)propionyl]-4-hydroxy-4-phenylpiperidine
1-[β-(2-Methyl-5-fluoro-3-indolyl)propionyl]-4-p-chlorophenyl-4-hydroxypiperidine
1-[β-(2-Methyl-5-fluoro-3-indolyl)propionyl]-4-hydroxy-4-p-tolylpiperidine
1-[β-(2-Methyl-5-fluoro-3-indolyl)propionyl]-4-hydroxy-4-m-trifluoromethylphenylpiperidine
1-[β-(2-Methyl-5-fluoro-3-indolyl)propionyl]-4-hydroxy-4-p-methoxyphenylpiperidine
1-(β-3-Indolylpropionyl)-4-hydroxy-4-p-tolylpiperidine
1-[β-(1,2-Dimethyl-3-indolyl)propionyl]-4-hydroxy-4-p-chlorophenylpiperidine
1-[β-(1,2-Dimethyl-5-fluoro-3-indolyl)propionyl]-4-hydroxy-4-p-chlorophenylpiperidine
1-[β-(2-Methyl-5-chloro-3-indolyl)propionyl]-4-hydroxy-4-p-chlorophenylpiperidine
1-[β-(2-Methyl-4-fluoro-3-indolyl)propionyl]-4-hydroxy-4-p-chlorophenylpiperidine
1-[β-(2-Methyl-6-fluoro-3-indolyl)propionyl]-4-hydroxy-4-p-chlorophenylpiperidine
1-[β-(1,2-Dimethyl-5-fluoro-3-indolyl)propionyl]-4-hydroxy-4-m-trifluoromethylphenylpiperidine The compound of the formula (VIII) thus obtained is converted to the corresponding 3-(γ-piperidinopropyl)indole compound of the formula (IX) by reacting the former with a reducing agent. A reducing agent such as alkali metal in alccohlic solvent, hydrogen in the presence of a catalyst, metal hydride and the like is preferably employed. Electrolytic reduction can also be used for the purpose.

It is especially preferable to use metal hydride such as lithium aluminium hydride, diisobutyl aluminium hydride, triisopropyl aluminium hydride, boron hydride or the like, in an inert organic solvent such as, for example, ether, tetrahydrofuran, dioxane, N-ethylmorphorine and the like.

According to the method mentioned above, the following compounds can be obtained.

2-Methyl-3-(γ-piperidinopropyl)indole
2-Methyl-3-(γ-piperidinopropyl)-5-chloroindole
2-Methyl-3-(γ-piperidinopropyl)-5-fluoroindole
2,5-Dimethyl-3-(γ-piperidinopropyl)indole
2-Methyl-3-(γ-piperidinopropyl)-4-fluoroindole
2-Methyl-3-(γ-piperidinopropyl)-6-fluoroindole
1,2-Dimethyl-3-(γ-piperidinopropyl)-5-fluoroindole
1-Ethyl-2-methyl-3-(γ-piperidinopropyl)-5-fluoroindole 1-Propyl-2-methyl-3-(γ-piperidinopropyl)-5-fluoroindole 3-(γ-Piperidinopropyl)-5-fluoroindole 1-Methyl-3-(γ-piperidinopropyl)-5-fluoroindole 2-Methyl-3-(γ-(4-phenylpiperidino)propyl]-5-fluoroindole 2-Methyl-3-[γ-(4-phenylpiperidino)propyl]indole 2-Methyl-3-[γ-(4-phenylpiperidino)propyl]-5-chloroindole 2,5-Dimethyl-3-[γ-(4-phenylpiperidino)propyl]indole 2-Methyl-3-[γ-(4-phenyl-4-hydroxypiperidino)-propyl]-5-fluoroindole 2-Methyl-3-[γ-(4-p-chlorophenyl-4-hydroxypiperidino)propyl]-5-fluoroindole 2-Methyl-3-[γ-(4-p-fluorophenyl-4-hydroxypiperidino)propyl]-5-fluoroindole 3-[γ-(4-p-Tolyl-4-hydroxypiperidino)propyl]indole 1,2-Dimethyl-3-[γ-(4-phenyl-4-hydroxypiperidino)-propyl]indole 3-[γ-(4-p-Chlorophenyl-4-hydroxypiperidino)-propyl]-5-chloroindole 3-[γ-(4-p-Fluorophenyl-4-hydroxypiperidino)-propyl]-5-fluoroindole 3-[γ-(4-m-Trifluoromethylphenyl-4-hydroxypiperidino)propyl]-5-fluoroindole 1-Methyl-3-[γ-(4-m-trifluoromethylphenyl-4-hydroxypiperidino)propyl]-5-fluoroindole 3-[γ-(4-p-Chlorophenyl-4-hydroxypiperidino)-propyl]-4-fluoroindole 3-[γ-(4-p-Chlorophenyl-4-hydroxypiperidino)-propyl]-5-fluoroindole An acid addition salt of the 3-(γ-piperidinopropyl)indole derivatives can be prepared by treating the free base with an acid such as hydrochloric acid, hydrobromic acid, sulfuric acid, phosphoric acid, nitric acid, acetic acid, oxalic acid, citric acid, tartaric acid, glycolic acid, benzoic acid, sulfamic acid, mandelic acid and the like.

γ-Piperidinobutyrophenones of the formula (II) can be prepared by contacting the 3-(γ-piperidinopropyl)indoles of the formula (IX) obtained above with an oxidizing agent. In this oxidative cleavage reaction it is preferable to use an oxidizing agent such as ozone, hydrogen peroxide, performic acid, peracetic acid, perbenzoic acid, chromic acid or potassium permanganate, although the oxidizing agent used for processes within the present invention is not limited to these and others may be used.

Generally, the reaction progresses readily at room temperature, but the temperature may be higher or lower if necessary to effect the desired control of the reaction. The oxidizing agent is preferably chromic acid or ozone. The reaction is preferably effected in the presence of a solvent. The choice of solvent depends on the oxidizing agent employed, and is selected from the group consisting of water, acetone, carbon tetrachloride, acetic acid, sulfuric acid and the like. The oxidizing agent is used in the stoichiometric amount or more. The reaction temperature varies depending on the oxidizing agent employed.

When the oxidation is carried out using chromic acid in the presence of acetic acid, it is preferable that the chromic acid may be used in 2–3 times the equimolar amount and that the reaction may be carried out at room temperature. A 3-(γ-piperidinopropyl)indole derivative is dissolved or suspended in the solvent and the oxidizing agent is added to the solution or suspension with stirring. Generally, the reaction terminates within about 24 hours.

When the oxidation is carried out using ozone, the reaction is preferably carried out at room temperature. A 3-(γ-piperidinopropyl)indole derivative is dissolved or suspended in the solvent such as formic acid, acetic acid, carbon tetrachloride or the like and ozonized oxygen is bubbled into the solution or suspension with stirring.

The γ-piperidinobutyrophenone derivative required can be separated from the reaction mixture in a crude form by extraction, with or without prior neutralization, and by evaporation to dryness. The product is further purified, if desired, by recrystallization from a suitable solvent such as ethanol, isopropanol or the like in a conventional manner.

The resulting compound of the formula (II) can be hydrolyzed to give a corresponding deacylated compound of the formula (III). The hydrolysis is carried out under an acidic or alkaline condition according to an ordinary hydrolysis procedure.

A γ-Piperidinobutyrophenone of the formula (IV) is prepared by diazotization of the o-amino-compound of the formula (III) obtained above wherein $R^5$ is hydrogen, and subsequent treatment of the resulting diazonium salt with a suitable agent to replace the diazonium group by hydrogen or halogen atom.

The diazotization is performed by a conventional method and the replacement reaction is conducted as follows.

By treating the diazonium salt with copper powder, fluoroboric acid or a metal halide such as cuprous chloride, cuprous bromide, potassium iodide, mercuric halide and the like, a γ-piperidonobutyrophenone of the formula (IV) wherein X is halogen can be obtained.

By treating the diazonium salt with a reducing agent such as ethanol, hydrophosphorous acid, alkaline formaldehyde, sodium stannite and the like, a γ-piperidinobutyrophenone of the formula (IV) wherein X is hydrogen can be obtained.

The above description is a general one, and in order to explain the diazotization and the replacement reaction more clearly, a few reaction schemes will be shown below:

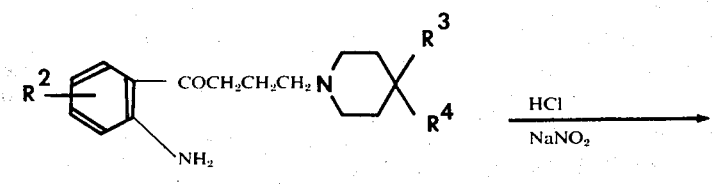

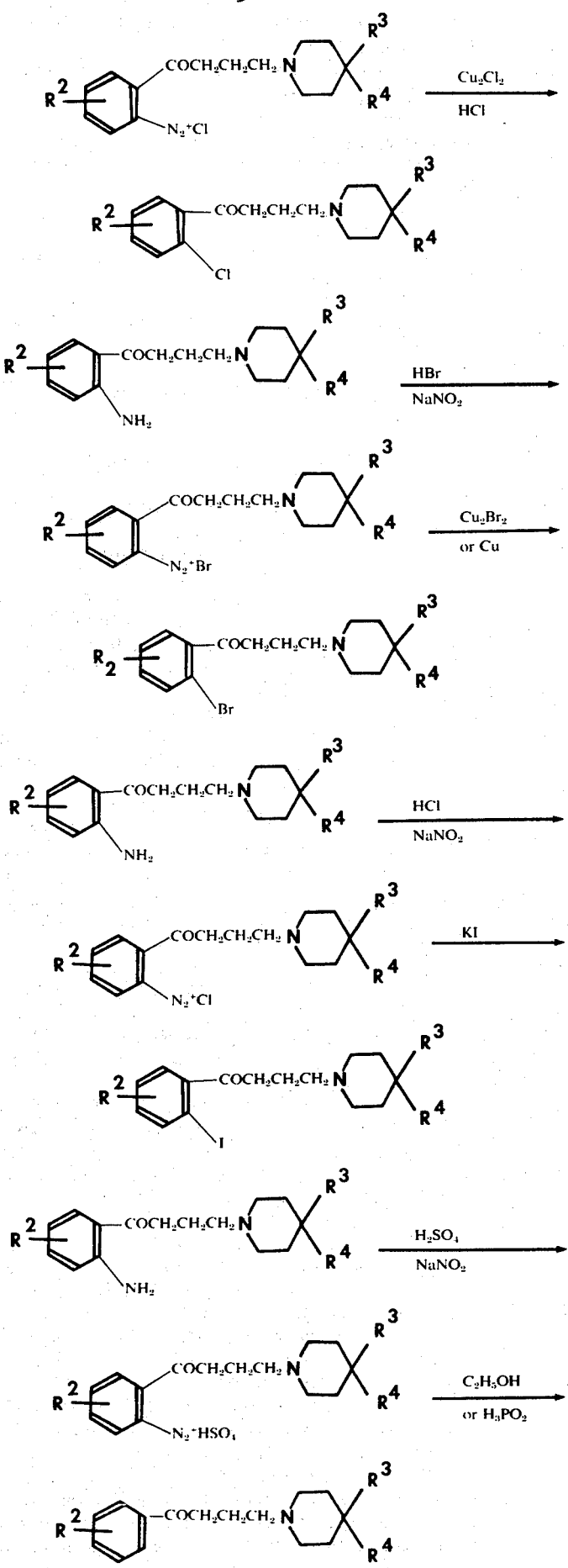

wherein R², R³ and R⁴ are as described above.

According to the present invention, the following γ-piperidinobutyrophenone derivatives are easily prepared

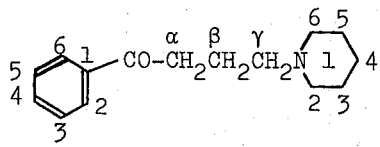

γ-Piperidino-2-chlorobutyrophenone
γ-Piperidino-2-bromobutyrophenone
γ-Piperidino-2-acetamido-butyrophenone
γ-Piperidino-2-amino-butyrophenone
γ-Piperidino-2-chloro-4-fluorobutyrophenone
γ-Piperidino-2-bromo-4-fluorobutyrophenone
γ-Piperidino-2-chloro-5-fluorobutyrophenone
γ-Piperidino-2-acetamido-4-fluorobutyrophenone
γ-Piperidino-2-amino-4-fluorobutyrophenone
γ-Piperidino-2-bromo-5-fluorobutyrophenone
γ-Piperidino-2,4-dichlorobutyrophenone
γ-Piperidino-2,4-dibromobutyrophenone
γ-(4-Phenylpiperidino)-2-chloro-4-fluorobutyrophenone
γ-(4-Phenylpiperidino)-2-amino-4-fluorobutyrophenone
γ-(4-Phenylpiperidino)-2-acetamido-4-fluorobutyrophenone
γ-(4-Hydroxy-4-phenylpiperidino)-2-acetamido-4-fluorobutyrophenone
γ-(4-Hydroxy-4-phenylpiperidino)-2-amino-4-fluorobutyrophenone
γ-(4-Hydroxy-4-phenylpiperidino)-2-chloro-4-fluorobutyrophenone
γ-(4-Hydroxy-4-phenylpiperidino)-2-bromo-4-fluorobutyrophenone
γ-(4-Hydroxy-4-p-chlorophenylpiperidino)-4-fluorobutyrophenone
γ-(4-Hydroxy-4-p-chlorophenylpiperidino)-2-chloro-4-fluorobutyrophenone
γ-(4-Hydroxy-4-p-chlorophenylpiperidino)-2-hydroxy-4-fluorobutyrophenone
γ-(4-Hydroxy-4-p-chlorophenylpiperidino)-3-fluorobutyrophenone
γ-(4-Hydroxy-4-p-chlorophenylpiperidino)-2-acetamido-5-fluorobutyrophenone
γ-(4-Hydroxy-4-p-chlorophenylpiperidino)-2-methylamino-5-fluorobutyrophenone
γ-(4-Hydroxy-4-p-chlorophenylpiperidino)-2-ethylamino-5-fluorobutyrophenone
γ-(4-Hydroxy-4-p-chlorophenylpiperidino)-2-chloro-5-fluorobutyrophenone
γ-(4-Hydroxy-4-p-chlorophenylpiperidino)-2-bromo-5-fluorobutyrophenone
γ-(4-Hydroxy-4-p-chlorophenylpiperidino)-2-hydroxy-5-fluorobutyrophenone
γ-(4-Hydroxy-4-p-chlorophenylpiperidino)-2,5-difluorobutyrophenone
γ-(4-Hydroxy-4-p-chlorophenylpiperidino)-2,5-dichlorobutyrophenone
γ-(4-Hydroxy-4-p-tolylpiperidino)-2-chloro-5-fluorobutyrophenone
γ-(4-Hydroxy-4-p-methoxyphenylpiperidino)-2-chloro-5-fluorobutyrophenone
γ-(4-Hydroxy-4-m-chlorophenylpiperidino)-2-chloro-5-fluorobutyrophenone
γ-(4-Hydroxy-4-p-chlorophenylpiperidino)-2-amino-4-fluorobutyrophenone
γ-(4-Hydroxy-4-p-chlorophenylpiperidino)-2-amino-4-fluorobutyrophenone
γ-(4-Hydroxy-4-p-tolylpiperidino)-2-amino-5-fluorobutyrophenone
γ-(4-Hydroxy-4-p-tolylpiperidino)-2-hydroxy-5-fluorobutyrophenone
γ-(4-Hydroxy-4-p-tolylpiperidino)-4-fluorobutylophenone
γ-(4-Hydroxy-4-p-tolylpiperidino)-2-methylamino-5-fluorobutyrophenone
γ-(4-Hydroxy-4-m-trifluoromethylphenylpiperidino)-2-amino-5-fluorobutyrophenone
γ-(4-Hydroxy-4-m-trifluoromethylphenylpiperidino)-2-chloro-5-fluorobutyrophenone
γ-(4-Hydroxy-4-m-trifluoromethylphenylpiperidino)-2-hydroxy-5-fluorobutyrophenone
γ-(4-Hydroxy-4-m-trifluoromethylphenylpiperidino)-3-fluorobutyrophenone
γ-(4-Hydroxy-4-m-trifluoromethylphenylpiperidino)-4-fluorobutyrophenone These compounds can be converted to the corresponding acid addition salts by a known method, for example, by dissolving the free base in an aqueous solution containing an appropriate acid and isolating the salt by evaporating the solution, or by reacting the free base with acid in an organic solvent.

These salts include pharmaceutically acceptable acid addition salts, e.g. hydrochloride, fumarate, formate, acetate, lactate, citrate, sulfonate, maleate, tartrate, methane sulfonate, salicylate and hydrosulfate.

Novel γ-piperidinobutyrophenone derivatives within the formula (X) and their pharmaceutically acceptable acid addition salts have central nervous system activities and are useful as anti-anxiety (sedative), antipsychosis, anti-emotional, anti-convulsive, neuroleptic and analgesic agents.

The pharmacological evaluation of the compounds of the invention has demonstrated that they possess a variety of depressant activities on the central nervous system in rats and mice. As representatives of these various activities shown by the compounds of the invention are the following.

Anti-apomorphine test was conducted according to P. A. J. Janssen et al.'s method ["Arzneimittel-Forschung", Vol. 10, pages 1003 – 1005 (1960)]. The effective doses, ED₅₀ values, of γ-(4-p-chlorophenyl-4-hydroxypiperidino)-2-acetamino-4-fluorobutyrophenone (Compound A), γ-(4-p-chlorophenyl-4-hydroxypiperidino)-2-amino-4-fluorobutyrophenone (Compound B), γ-(4-p-chlorophenyl-4-hydroxypiperidino)-2-chloro-4-fluorobutyropyenone (Compound C), γ-(4-hydroxy-4-m-trifluoromethylphenylpeperidino)-2-acetamino-4-fluorobutyrophenone (Compound D) and γ-(4-hydroxy-4-m-trifluoromethylphenylpiperidino)-2-amino-4-fluorobutyrophenone (Compound E) each administered subcutaneously in rats, were found to be respectively, 0.12 mg/kg.; 0.12 mg/kg.; 0.40 mg/kg.; 0.10 mg/kg.; and 0.04 mg/kg., while the ED₅₀ value of Haloperidol (Janssen), that is, γ-(4-p-chlorophenyl-4-hydroxypiperidino)-4-fluorobutyrophenone, which has a similar structure to those of the compounds of the invention and is now widely used as an psychotropic drug, was found to be 0.55 mg/kg.

The test for suppression of conditioned avoidance response by the jumping box were carried out according to P. A. J. Janssen et al.'s method ["Arzneimittel-Forschung", Vol. 11, pages 1037 – 1043 (1961)]. The $ED_{50}$ values of the Compounds (A), (B), (C), (D) and (E) mentioned above found to be respectively 0.046 mg/kg.; 0.054 mg/kg.; 0.080 mg/kg.; 0.030 mg/kg.; and 0.020 mg/kg, whereas the $ED_{50}$ value of Haloperidol (Janssen) was found to be 0.105 mg/kg, all determined subcutaneously in rats.

While the compounds of the invention have higher and superior depressing activities on the central nervous system than those of Haloperidol as shown above, there is scarcely shown any toxic symptoms. Lethal doses, $LD_{50}$ values, of the compounds (A) and (E) were found to be, respectively, 1000 mg/kg. and 600 mg/kg, whereas the $LD_{50}$ value of Haloperidol was found to be 260 mg/kg., all determined subcutaneously in mice.

A pharmaceutically active compound within the formula (X) may be made up into a tablet for oral administration, in which this compound is a sole active ingredient. A typical tablet contains from 1 to 2 percent binder, e.g. tragacanth; from 3 to 10 percent lubricant, e.g. talcum; from 0.25 to 1.0 percent lubricant, e.g. magnesium stearate; an average dose of active ingredient; and q.s. 100 percent of filler, e.g. lactose. The usual oral dosage is 1 – 100 mg per os daily.

The following examples illustrate the present invention, but do not limit its scope.

EXAMPLE 1

Stage 1

A stirred mixture of 14.5 g of phenylhydrazine hydrochloride, 19.2 g of 1-(γ-acetylbutyryl)piperidine and 100 ml of acetic acid was heated at 75° – 80°C for 4 hours. After cooling, the reaction mixture was poured into 700 ml of cold water. The solid material which was separated was filtered, washed with water and recrystallized from ethanol to give 1-[β-(2-methyl-3-indolyl)-propionyl]piperidine having a melting point of 141° – 143°C.

Stage 2

To a stirred mixture of 2.0 g of lithium aluminium hydride and 50 ml of ether was added dropwise a solution of 4.9 g of 1-[β-(2-methyl-3-indolyl)propionyl]piperidine in 130 ml of tetrahydrofuran over a period of 30 minutes under gentle refluxing. Stirring and refluxing were continued for additional 3 hours and the reaction mixture was added dropwise with a mixture of 10 ml of water and 40 ml of tetrahydrofuran under cooling with ice. The resulting precipitate was filtered off and the filtrate was evaporated to dryness. Recrystallization of the residue from benzene gave 2-methyl-3-(γ-piperidinopropyl)indole having a melting point of 140.5° 141°C.

By a method similar to the above procedure, the following compounds were obtained.

2-Methyl-3-[γ-(4-phenylpiperidino)propyl]indole, melting point 119.5° – 121.0°C

2-Methyl-3-[γ-(4-phenylpiperidino)propyl]-5-fluoroindole, melting point 153° – 154°C 2-Methyl-3-[γ-(4-hydroxy-4-phenylpiperidino)-propyl]-5-fluoroindole, melting point 161° – 162°C Stage 3

While oxygen containing 3 – 4 % ozone was introduced into a solution of 2.0 g of 2-methyl-3-(γ-piperidinopropyl)-indole in 40 ml of acetic acid and the solution became pale yellow (in fact, about 35 minutes were required), the temperature was maintained at 16° – 20°C.

After the reaction mixture was made alkaline by addition of a 10 % aqueous solution of sodium hydroxide, it was extracted with ethyl acetate. The extract was washed with water and evaporated to give an oily residue. The residue was crystallized from ether-petroleum ether to give γ-piperidino-2-acetaminobutyrophenone having a melting point of 45° – 48°C.

According to a method similar to that mentioned above, the following compounds were obtained.

γ-(4-Phenylpiperidino)-2-acetaminobutyrophenone hydrochloride, melting point 240°C (decomposition)

γ-(4-Phenylpiperidino)-2-acetamino-5-fluorobutyrophenone, melting point 130.0° – 131.0°C, and its hydrochloride, melting point 248°C (decomposition)

γ-(4-Hydroxy-4-phenylpiperidino)-2-acetamino-5-fluorobutyrophenone, melting point 120.0° – 121.0°C.

Stage 4

A solution of 3.5 g of γ-piperidino-2-acetaminobutyrophenone hydrochloride and 6 ml of concentrated hydrochloric acid in 70 ml of ethanol was heated under reflux for 3 hours. After cooling the reaction mixture was diluted with 100 ml of water, and made alkaline with 50 % aqueous sodium hydroxide. The resulting oily substance was extracted with ethyl acetate. The extract was washed with water and evaporated to give a residue, which was recrystallized from aqueous ethanol to give γ-piperidino-o-aminobutyrophenone, melting at 92° – 93°C.

Stage 5

To a cooled solution of 3.6 g of γ-piperidino-2-aminobutyrophenone in 35 ml of 2N hydrochloric acid was added dropwise a solution of 1.1 g of sodium nitrite in 5 ml of water at a temperature below 0°C with stirring. The resulting diazonium salt solution was added to a cold suspension of 1.5 g of cuprous chloride in 5 ml of concentrated hydrochloric acid with vigorous stirring. The mixture was stirred for 30 minutes under ice-cooling, and stirring was further continued for 2 hours at room temperature and then for 1 hour at 55° – 60°C. After cooling, the reaction mixture was made alkaline with ammonium hydroxide and was extracted with ether. The ethereal extract was washed with an aqueous solution saturated with sodium chloride, dried over anhydrous sodium sulfate and evaporated to give an oily residue. The residual oil was treated with anhydrous hydrogen chloride in ether to give crystals of γ-p-iperidino-2-chlorobutyrophenone hydrochloride, which were recrystallized from ethanol. Melting point 166° – 167°C.

By a method similar to the above procedure,

γ-(4-Phenylpiperidino)-2-chlorobutyrophenone hydrochloride, melting point 182° – 184°C, was obtained.

EXAMPLE 2

Stage 1

To a stirred solution of 15.0 g of β-(2-methyl-3-indolyl)propionic acid and 7.5 g of triethylamine in 100 ml of tetrahydrofuran was added dropwise 8.0 g of ethyl chloroformate at a temperature below −5°C. Stirring was continued for additional 15 minutes at −5°C and thereto was added dropwise a solution of 6.3 g of piperidine in 10 ml of tetrahydrofuran. After addition was completed, the reaction mixture was stirred for 4 hours at room temperature and then filtered. The filtrate was evaporated under reduced pressure to give a residue, which was crystallized from ether and recrystallized from ethanol to give 1-β-(2-methyl-3-indolyl)propionyl piperidine, melting at 142° – 142.5°C.

Stage 2

Using a procedure similar to that of the stage 2 of the Example 1, 2-methyl-3-(γ-piperidinopropyl)indole was obtained, melting point 140.5° – 141°C. Stage 3

To a stirred solution of 1.1 g of 2-methyl-3-(γ-piperidinopropyl)indole in 10 ml of acetic acid was added a solution of 1.0 g of chromic anhydride in 1 ml of water at a temperature below 16°C. After stirring overnight at room temperature, the reaction mixture was poured into 80 ml of water and made alkaline with a 10 % aqueous solution of sodium hydroxide and 50 ml of chloroform was then added and the mixture was filtered. The filtrate was extracted with chloroform and the extract was washed with an aqueous solution saturated with sodium chloride, dried over anhydrous sodium sulfate and evaporated to give crystals of γ-piperidino-2-acetaminobutyrophenone having an infrared spectrum identical with that of the compound obtained by Example 1. These crystals were treated with hydrogen chloride in ether to give the hydrochloride melting at 147° – 148°C.

EXAMPLE 3

Stage 1

To a solution of 10.8 g of phenylhydrazine in 100 ml of 30 % aqueous acetic acid was added 27.3 g of 1-(γ-acetylbutyryl)-4-phenylpiperidine and the resulting mixture was stirred for 30 minutes at room temperature. The precipitate was filtered, and washed with water. The precipitate was added to 180 ml of 5 % ethanolic hydrogen chloride, and the mixture was heated under reflux for 4 hours. The solvent was distilled off under reduced pressure to give the residue, to which was added 100 ml of water. The resulting solid substance was recrystallized from ethanol to give 1-[β-(2-methyl-3-indolyl)propionyl)]-4-phenylpiperidine, melting at 121° – 122°C.

By a method similar to that of the above example, the following compounds were obtained.

1-[β-(2-Methyl-5-fluoro-3-indolyl)propionyl]-4-phenylpiperidine, melting point 156.5° – 157.0°C 1-[β-(2-Methyl-5-fluoro-3-indolyl)propionyl]-4-hydroxy-4-phenylpiperidine, melting point 157° – 158°C 1-[β-(2-Methyl-5-fluoro-3-indolyl)propionyl]-4-hydroxy-4-p-chlorophenylpiperidine, melting point 180.0° – 181.5°C 1-[β-(2-Methyl-5-fluoro-3-indolyl)propionyl]-4-hydroxy-4-p-tolylpiperidine, melting point 177° – 178°C 1-[β-(2-Methyl-5-fluoro-3-indolyl)propionyl]-4-hydroxy-4-m-trifluoromethylphenylpiperidine Stage 2

The compounds obtained in the Stage 1 were converted to the following compounds respectively by the method described in Stage 2 of Example 1.

2-Methyl-3-[γ-(4-phenylpiperidino)propyl]indole, melting point 119.5° – 121.0°C

2-Methyl-3-[γ-(4-phenylpiperidino)propyl]-5-fluoroindole, melting point 153° – 154°C 2-Methyl-3-[γ-(4-hydroxy-4-phenylpiperidino)propyl]-5-fluoroindole, melting point 161° – 162°C 2-Methyl-3-[γ-(4-hydroxy-4-p-chlorophenylpiperidino)propyl]-5-fluoroindole, melting point 167.5° – 169.5°C 2-Methyl-3-[γ-(4-hydroxy-4-p-tolylpiperidino)propyl]-5-fluoroindole, melting point 183° – 184°C 2-Methyl-3-[γ-(4-hydroxy-4-m-trifluoromethylphenylpiperidino)propyl]-5-fluoroindole, melting point 143.5° – 144.5°C Stage 3

To a solution of 7.6 g of 2-methyl-3-[γ-(4-phenylpiperidino)propyl]indole in 100 ml of acetic acid was introduced 3 % ozone-containing oxygen gas for about 2 hours at 15° – 20°C. The color of the solution was changed gradually from yellow to red and finally to yellow. The resulting yellow solution was made alkaline with 50 % aqueous sodium hydroxide and was extracted with chloroform. The extract was washed with water, dried over potassium carbonate and evaporated to give γ-(4-phenylpiperidino)-2-acetaminobutyrophenone as an oil, which was treated with hydrogen chloride in alcohol to give the hydrochloride, melting at 237° – 239°C.

Using the method described above, the following compounds were obtained.

γ-(4-Phenylpiperidino)-2-acetamino-5-fluorobutyrophenone, melting point 130° – 131°C. and its hydrochloride, melting point 248°C (decomposition)

γ-(4-Hydroxy-4-phenylpiperidino)-2-acetamino-5-fluorobutyrophenone, melting point 120° – 121°C γ-(4-p-Chlorophenyl-4-hydroxypiperidino)-2-acetamino-5-fluorobutyrophenone, melting point 126.5° – 127.5°C γ-(4-Hydroxy-4-p-tolylpiperidino)-2-acetamino-5-fluorobutyrophenone, melting point 119.5° – 121.0°C γ-(4-Hydroxy-4-m-trifluoromethylphenylpiperidino)-2-acetamino-5-fluorobutyrophenone, melting point 152.0° – 153.0°C Stage 4

A solution of 3.5 g of γ-(4-phenylpiperidino)-2-acetaminobutyrophenone hydrochloride and 6 ml of concentrated hydrochloric acid in 70 ml of ethanol was heated under reflux for 3 hours. After cooling, the reaction mixture was diluted with 100 ml of water, and made alkaline with 50 % aqueous sodium hydroxide. The resulting oily substance was extracted with ethyl acetate. The extract was washed with water and evaporated to give a residue, which was recrystallized from aquous ethanol to give γ-(4-phenylpiperidino)-o-aminobutyrophenone melting at 61° – 61.5°C.

Using the method described above, the following compounds were obtained.

γ-(4-Phenylpiperidino)-2-amino-5-fluorobutyrophenone, melting point 89.0° – 90.0°C γ-(4-Hydroxy-4-phenylpiperidino)-2-amino-5-fluorobutyrophenone, melting point 102.0° – 103.0°C, and its dihydrochloride, melting point 142.0°C (decomposition)

γ-(4-Hydroxy-4-p-chlorophenylpiperidino)-2-amino-5-fluorobutyrophenone dihydrochloride, melting point 203.5°C (decomposition)

γ-(4-Hydroxy-4-p-tolylpiperidino)-2-amino-5-fluorobutyrophenone dihydrochloride, melting point 172° – 173°C (decomposition)

γ-(4-Hydroxy-4-m-trifluoromethylphenylpiperidino)-2-amino-5-fluorobutyrophenone dihydrochloride hydrate, melting point 181°C (decomposition)

Stage 5

To a cooled solution of 7.13 g of γ-(4-hydroxy-4-phenylpiperidino)-2-amino-5-fluorobutyrophenone in 200 ml of 5 % hydrochloric acid was added portionwise 1.52 g of sodium nitrite at a temperature from −5°C to 0°C with stirring. The resulting diazonium salt solution was added to a cooled solution of 90 ml of a 50 % aqueous solution of hypophosphorous acid with vigorous stirring. After stirring for 2 hours under cooling, the mixture was kept in a refrigerator overnight. The reaction mixture was made alkaline by the addition of 10 % aqueous sodium hydroxide and extracted with ether. The ethereal extract was washed with water, dried over anhydrous sodium sulfate and evaporated to dryness. The residual crystalline solid was recrystallized from diisopropylether to give γ-(4-hydroxy-4-phenylpiperidino)-3-fluorobutyrophenone, melting at 119° – 120.5°C.

By a method mentioned above, the following compounds were obtained.

γ-(4-Hydroxy-4-phenylpiperidino)butyrophenone, melting point 128.5° – 129.5°C

γ-(4-Hydroxy-4-phenylpiperidino)butyrophenone hydrochloride, melting point 181.5° – 183.5°C (decomposition)

γ-(4-Hydroxy-4-p-chlorophenylpiperidino)-butyrophenone, melting point 125° – 127°C γ-(4-Hydroxy-4-phenylpiperidino)-3-chlorobutyrophenone hydrochloride, melting point 227.5° – 229°C γ-(4-Hydroxy-4-p-chlorophenylpiperidino)-3-fluorobutyrophenone γ-(4-Hydroxy-4-p-tolylpiperidino)-3-fluorobutyrophenone γ-(4-Hydroxy-4-m-trifluoromethylphenyl-piperidino)-3-fluorobutyrophenone

EXAMPLE 4

To a cooled solution of 7.1 g of γ-(4-hydroxy-4-phenylpiperidino)-2-amino-5-fluorobutyrophenone in 200 ml of 2N-hydrochloric acid was added a solution of 1.52 g of sodium nitrite in 10 ml of water at a temperature below 0°C with stirring. The resulting diazonium salt solution was added to a cooled suspension of 2.0 g of cuprous chloride in 20 ml of concentrated hydrochloric acid with vigorous stirring. Stirring was continued for additional 2 hours at room temperature, and then for further 2 hours at 55° – 60°C. After cooling, the reaction mixture was made alkaline by the addition of an aqueous ammonium hydroxide solution and extracted with chloroform. The extract was washed with water, dried over anhydrous sodium sulfate and evaporated to give γ-(4-hydroxy-4-phenyl)-2-chloro-5-fluorobutyrophenone. The melting point of its hydrochloride was 197.5° – 200°C (decomposition).

By a method similar to that described above, the following compounds were obtained.

γ-(4-Phenylpiperidino)-2-chloro-5-fluorobutyrophenone hydrochloride, melting point 160° – 164°C γ-(4-Hydroxy-4-p-chlorophenylpiperidino)-2-chloro-5-fluorobutyrophenone γ-(4-Hydroxy-4-phenylpiperidino)-2-bromo-5-fluorobutyrophenone hydrochloride, melting point 217° – 218°C (decomposition)

γ-(4-Hydroxy-4-p-chlorophenylpiperidino)-2-bromo-5-fluorobutyrophenone

γ-(4-Hydroxy-4-p-tolylpiperidino)-2-chloro-5-fluorobutyrophenone hydrochloride, melting point 160.5° – 163.0°C γ-(4-Hydroxy-4-m-trifluoromethylphenylpiperidino)-2-chloro-5-fluorobutyrophenone γ-(4-Hydroxy-4-p-methoxyphenylpiperidino)-2-chloro-5-fluorobutyrophenone

EXAMPLE 5

To a cooled solution of 1.5 g of γ-(4-phenylpiperidino)-o-aminobutyrophenone in 54 ml of 10 % hydrochloric acid was added 0.35 g of sodium nitrite in portions at a temperature from −5°C to 0°C with stirring. The resulting diazonium salt solution was added to a cooled solution of 20 ml of 50 % hypophosphorous acid with vigorous stirring. Stirring was continued for 1.5 hours. After the reaction mixture was stored in a refrigerator overnight, the mixture was made alkaline with 10 % aqueous sodium hydroxide. The oil separated was extracted with ether. The ethereal extract was washed with an aqueous solution saturated with sodium chloride, dried over anhydrous sodium sulfate and evaporated to give a residue. The solid residue was recrystallized from ethanol to give γ-(4-phenylpiperidino)butyrophenone melting at 59° – 60°C.

By a method mentioned above, the following compounds were prepared.

γ-Piperidinobutyrophenone hydrochloride, melting point 210° – 211°C

γ-(4-Hydroxy-4-p-chlorophenylpiperidino)-4-fluorobutyrophenone, melting point 149° –150°C γ-(4-Hydroxy-4-p-tolylpiperidino)-4-fluorobutyrophenone, melting point 119° –120°C γ-(4-Hydroxy-4-m-trifluoromethylphenyl-piperidino)-4-fluorobutyrophenone hydrochloride, melting point 206° – 207°C γ-[4-Hydroxy-4-(3,4-dichlorophenyl)-piperidino]-4-fluorobutyrophenone, melting point 135° – 137°C γ-4-Hydroxy-4-(3-methyl-4-chlorophenyl)-piperidino-4-fluorobutyrophenone, melting point 123° – 124°C

EXAMPLE 6

Stage 1

To a stirred solution of 12.75 g of β-(6-fluoro-2-methyl-3-indolyl)propionic acid and 5.83 g of triethylamine in 70 ml. of tetrahydrofuran was added dropwise a solution of 6.25 g of ethyl chloroformate in 20 ml. of tetrahydrofuran at a temperature below 2°C. Stirring was continued for additional 15 minutes at a temperature below 2°C and thereto was added dropwise a solution of 12.2 g of 4-p-chlorophenyl-4-hydroxypiperidine in 50 ml. of tetrahydrofuran and 150 ml. of chloroform. After addition was completed, the reaction mixture was stirred for 5 hours at room temperature and then concentrated to dryness under reduced pressure. The residue obtained was diluted with water and extracted with ethyl acetate. The ethyl acetate solution was washed successively with a 10 % aqueous hydrochloric acid solution, a 10 % aqueous sodium hydroxide solution, and finally a saturated aqueous sodium chloride solution, dried over anhydrous sodium sulfate and evaporated under reduced pressure to yield 1-[β-(6-fluoro-2-methyl-3-indolyl)propionyl]-4-p-chlorophenyl-4-hydroxypiperidine as a reddish oily product, which was crystallized and recrystallized from aqueous ethanol. Melting point 175.0° – 176.0°C.

Stage 2

To a stirred mixture of 6.6 g of lithium aluminium hydride and 50 ml. of ether was added dropwise a solution of 26.9 g of crude 1-[β-(6-fluoro-2-methyl-3-indolyl)propionyl]-4-p-chlorophenyl-4-hydroxypiperidine, which was obtained in Stage 1, in 250 ml. of tetrahydrofuran under gentle refluxing. Stirring and refluxing were continued for additional 3.5 hours and a mixture of water and tetrahydrofuran was added dropwise thereto under cooling with ice. The resulting precipitate was filtered off and the filtrate was evaporated to dryness. The residue was crystallized from toluene to give 2-methyl-3-[γ-(4-p-chlorophenyl-4-hydroxypiperidino)propyl]-6-fluoindole having a melting point of 167.0° to 169.0°C.

Stage 3

Oxygen containing 3 - 4 % of ozone was introduced into a solution of 14.9 g of 2-methyl-3-[γ-(4-p-chlorophenyl-4-hydroxypiperidino)propyl]-6-fluorindole in 150 ml. of acetic acid at a temperature of 15° – 20°C. While oxygen containing ozone was bubbled for 1 hour, the reaction mixture became dark red and then gradually discolored. The reaction mixture obtained was diluted with water, made alkaline with a 20 % aqueous sodium hydroxide solution and extracted with ethyl acetate. The extract was washed with water, dried over anhydrous potassium carbonate and evaporated to dryness. The residual oil was crystallized from aqueous ethanol to give γ-(4-p-chlorophenyl-4-hydroxypiperidino)-2-acetamino-4-fluorobutyrophenone having a melting point of 119.5° – 121.0°C.

Stage 4

A solution of 7.3 g of γ-(4-p-chlorophenyl-4-hydroxypiperidino)-2-acetamino-4-fluorobutyrophenone and 8 ml. of concentrated hydrochloric acid in 80 ml. of ethanol was heated under refluxing for 3 hours. After ethanol was evaporated to dryness, the residual solid was recrystallized from methanol to give γ-(4-p-chlorophenyl-4-hydroxypiperidino)-2-amino-4-fluorobutyrophenone monohydrochloride having a melting point of 236°C (decomposition).

The above-obtained hydrochloride was treated with an aqueous potassium carbonate solution to give the free base, which was recrystallized from aqueous ethanol to yield γ-(4-p-chlorophenyl-4-hydroxypiperidino)-2-amino-4-fluorobutyrophenone having a melting point of 144.5° – 146.5°C Stage 5

To a cooled suspension of 4.7 g of γ-(4-p-chlorophenyl-4-hydroxypiperidino)-2-amino-4-fluorobutyrophenone hydrochloride in 110 ml. of 1 N hydrochloric acid was added portionwise 0.7 g of sodium nitrite at a temperature below 5°C with stirring. After the resulting mixture was stirred for additional 30 minutes, the mixture was added to a cooled suspension of 1.5 g of cuprous chloride in 15 ml. of concentrated hydrochloric acid with vigorous stirring. Stirring was continued for additional 30 minutes at room temperature, and then 2 hours at 50° – 70°C. After cooling, the reaction mixture was made alkaline with concentrated ammonium hydroxide and extracted with chloroform. The extract was washed with water, dried over anhydrous potassium carbonate and evaporated. The residual oil was treated with hydrogen chloride in ether to give γ-(4-p-chlorophenyl-4-hydroxypiperidino)-2-chloro-4-fluorobutyrophenone hydrochloride, which was recrystallized from isopropyl alcohol. Melting point 185.5° – 188.0°C (decomposition).

EXAMPLE 7

Stage 1

To a stirred solution of 29.8 g of β-(6-fluoro-2-methyl-3-indolyl)propionic acid and 13.8 g of triethylamine in 180 ml of tetrahydrofuran was added dropwise a solution of 14.7 g of ethyl chloroformate in 20 ml of tetrahydrofuran at a temperature of 0° – 5°C. Stirring was continued for additional 15 minutes at a temperature below 5°C and thereto was added dropwise a solution of 33 g of 4-hydroxy-4-m-trifluoromethylphenylpiperidine in 250 ml of tetrahydrofuran. After addition was completed, the reaction mixture was stirred for 5 hours at room temperature and then concentrated to dryness under reduced pressure. The residue obtained was diluted with water and extracted with ethyl acetate. The ethyl acetate solution was washed successively with a 10 % aqueous hydrochloric acid solution, a 10 % aqueous sodium hydroxide solution and a saturated aqueous sodium chloride solution, dried over anhydrous sodium sulfate and evaporated under reduced pressure to yield 1-[β-(6-fluoro-2-methyl-3-indolyl)propionyl]-4-hydroxy-4-m-trifluoromethylphenylpiperidine as a reddish oily product.

Stage 2

To a stirred mixture of 15.3 g of lithium aluminium hydride and 100 ml of ether was added dropwise a solution of 50.1 g of crude 1-[β-(6-fluoro-2-methyl-3-indolyl)-propyl]-4-hydroxy-4-m-trifluoromethylphenylpiperidine, which was obtained in Stage 1, in 250 ml of tetrahydrofuran under gentle refluxing. Stirring and refluxing were continued for additional 4 hours and the reaction mixture was added dropwise with a mixture of water and tetrahydrofuran under cooling with ice. The resulting precipitats was filtered off, and the filtrate was dried over anhydrous sodium sulfate and evaporated under reduced pressure to yield 2-methyl-3-]γ-(4-hydroxy-4-m-trifluoromethylphenylpiperidino)propyl]-6-fluoroindole having a melting point of 129° – 133°C.

Stage 3

Oxygen containing 3 –4 % of ozone was introduced into a solution of 10 g of 2-methyl-3-[γ-(4-hydroxy-4-m-trifluoromethylphenylpiperidino)propyl]-6-fluoroindole in 100 ml of acetic acid at a temperature of 15° to 20°C. While oxygen containing ozone was bubbled for 1.5 hours, the reaction mixture became dark-red and then gradually discolored. The reaction mixture obtained was diluted with water, made alkaline by the addition of a 20 % aqueous sodium hydroxide solution and extracted with ethyl acetate. The extract was washed with water, dried over anhydrous potassium carbonate and evaporated to dryness. The residual oil was crystallized from aqueous ethanol to give γ-(4-hydroxy-4-m-trifluoromethylphenylpiperidino)-2-acetamino-4-fluorobutyrophenone having a melting point of 134° – 135.5°C.

Stage 4

A solution of 3.8 g of γ-(4-hydroxy-4-m-trifluoromethylphenylpiperidino)-2-acetamino-4-fluorobutyrophenone and 3.6 ml of concentrated hydrochloric acid in 36 ml of ethanol was heated under refluxing for 2 hours. After ethanol was evaporated to dryness, the residual solid was suspended in 10 ml of water and made alkaline by the addition of a 10 % aqueous sodium hydroxide solution. The insoluble substance was extracted with ethyl acetate. The ethyl acetate layer was then washed with a saturated aqueous sodium chloride solution, dried over anhydrous sodium sulfate and evaporated under reduced pressure. The residual solid was recrystallized from aqueous ethanol to give γ-(4-hydroxy-4-m-trifluoromethylphenylpiperidino)-2-amino-4-fluorobutyrophenone having a melting point of 105.5° – 107°C.

What is claimed is:

1. A compound of the formula,

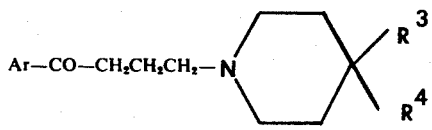

wherein Ar is a group having the formula,

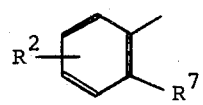

(wherein $R^7$ is amino or $C_1$–$C_5$ alkanoylamino; and $R^2$ is hydrogen or halogen), or a group having the formula,

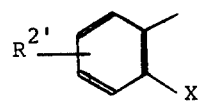

(wherein X is halogen; and $R^{2'}$ is halogen); $R^3$ is hydrogen or unsubstituted or $C_1$–$C_4$ alkyl-, $C_1$–$C_4$ alkoxy-, halogen- or trifluoromethyl-substituted phenyl; and $R^4$ is hydrogen or hydroxyl, and a pharmaceutically acceptable acid addition salt thereof.

2. A compound of the formula,

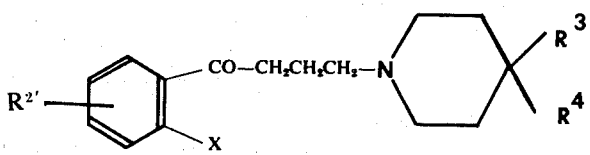

wherein X is halogen; $R^{2'}$ is halogen; $R^3$ is phenyl substituted by $C_1$–$C_4$ alkyl, $C_1$–$C_4$ alkoxy, halogen or trifluoromethyl and $R^4$ is hydroxyl, and a pharmaceutically acceptable acid addition salt thereof.

3. γ-(4-p-Chlorophenyl-4-hydroxypiperidino)-2-acetamino-4-fluorobutyrophenone and pharmaceutically acceptable acid addition salts thereof.

4. γ-(4-p-Chlorophenyl-4-hydroxypiperidino)-2-amino-4-fluorobutyrophenone and pharmaceutically acceptable acid addition salts thereof.

5. γ-(4-Hydroxy-4-m-trifluoromethylpiperidino)-2-acetamino-4-fluorobutyrophenone and pharmaceutically acceptable acid addition salts thereof.

6. γ-(4-Hydroxy-4-m-trifluomethylphenylpiperidino)-2-amino-4-fluorobutyrophenone and pharmaceutically acceptable acid addition salts thereof.

7. γ-(4-p-Chlorophenyl-4-hydroxypiperidino)-2-chloro-4-fluorobutyrophenone and pharmaceutically acceptable acid addition salts thereof.

8. γ-(4-Hydroxy-4-m-trifluoromethylphenylpiperidino)-2-methylamino-4-fluorobutyrophenone and pharmaceutically acceptable acid addition salts thereof.

9. γ-(4-Hydroxy-4-p-methoxyphenylpiperidino)-2-acetamino-4-fluorobutyrophenone and pharmaceutically acceptable acid addition salts thereof.

10. γ-(4-Hydroxy-4-p-tolylpiperidino)-2-acetamino-4-fluorobutyrophenone and pharmaceutically acceptable acid addition salts thereof.

11. γ-(4-Hydroxy-4-p-tolylpiperidino)-2-amino-4-fluorobutyrophenone and pharmaceutically acceptable acid salts thereof.

12. γ-(4-Hydroxy-4-phenylpiperidino)-2-acetamino-4-fluorobutyrophenone and pharmaceutically acceptable acid addition salts thereof.

13. γ-(4-Hydroxy-4-phenylpiperidino)-2-amino-4-fluorobutyrophenone and pharmaceutically acceptable acid addition salts thereof.

14. γ-(4-Hydroxy-4-m-trifluoromethylphenylpiperidino)-2-propionylamino-4-fluorobutyrophenone and pharmaceutically acceptable acid addition salts thereof.

15. γ-(4-Hydroxy-4-m-trifluoromethylphenylpiperidino)-2-(N-acetyl)methylamino-4-fluorobutyrophenone and pharmaceutically acceptable acid addition salts thereof.

16. γ-(4-Hydroxy-4-m-trifluoromethylphenylpiperidino)-2-chloro-4-fluorobutyrophenone and pharmaceutically acceptable acid addition salts thereof.

17. γ-(40Hydroxy-4-m-trifluoromethylphenylpiperidino)-2,4-difluorobutyrophenone and pharmaceutically acceptable acid addition salts thereof.

* * * * *

UNITED STATES PATENT OFFICE
CERTIFICATE OF CORRECTION

PATENT NO. : 3,907,812
DATED : September 23, 1975
INVENTOR(S) : Hisao YAMAMOTO et al.

It is certified that error appears in the above-identified patent and that said Letters Patent are hereby corrected as shown below:

FOREIGN APPLICATION PRIORITY DATA

July 16, 1969    Japan.................... 56607/69

August 5, 1969   Japan.................... 62146/69

August 6, 1969   Japan.................... 62479/69

March 7, 1970    Japan.................... 19400/70

March 20, 1970   Japan.................... 23723/70

Signed and Sealed this twenty-seventh Day of January 1976

[SEAL]

Attest:

RUTH C. MASON
Attesting Officer

C. MARSHALL DANN
Commissioner of Patents and Trademarks